US012680367B2

(12) United States Patent
Pohl et al.

(10) Patent No.: US 12,680,367 B2
(45) Date of Patent: Jul. 14, 2026

(54) METHOD FOR GENERATING A HAPTIC FEEDBACK ON A VEHICLE PART

(71) Applicant: BROSE FAHRZEUGTEILE SE & CO. KOMMANDITGESELLSCHAFT, BAMBERG, Bamberg (DE)

(72) Inventors: Florian Pohl, Ebersdorf (DE); Christian Herrmann, Großheirath (DE); Thomas Liedtke, Eisenach (DE); Bernd Herthan, Michelau (DE); Christian Weidenbacher, Donnersdorf (DE)

(73) Assignee: BROSE FAHRZEUGTEILE SE & CO. KOMMANDITGESELLSCHAFT, BAMBERG (DE)

( * ) Notice: Subject to any disclaimer, the term of this patent is extended or adjusted under 35 U.S.C. 154(b) by 139 days.

(21) Appl. No.: 18/020,567

(22) PCT Filed: Aug. 5, 2021

(86) PCT No.: PCT/EP2021/071827
§ 371 (c)(1),
(2) Date: Feb. 9, 2023

(87) PCT Pub. No.: WO2022/033942
PCT Pub. Date: Feb. 17, 2022

(65) Prior Publication Data
US 2023/0295977 A1      Sep. 21, 2023

(30) Foreign Application Priority Data

Aug. 10, 2020      (DE) ..................... 10 2020 210 109.4

(51) Int. Cl.
*E05F 15/695* (2015.01)
*B60J 5/04* (2006.01)
(Continued)

(52) U.S. Cl.
CPC ........... *E05F 15/695* (2015.01); *B60J 5/0493* (2013.01); *B60K 35/25* (2024.01); *B60K 35/80* (2024.01);
(Continued)

(58) Field of Classification Search
CPC .............. E05F 15/6892; E05F 15/6894; E05F 15/6896; E05F 15/6899; E05F 15/6901;
(Continued)

(56) References Cited

U.S. PATENT DOCUMENTS

| | | | |
|---|---|---|---|
| 10,884,614 B1 * | 1/2021 | Austria | ............... G06F 3/04883 |
| 2007/0255468 A1 | 11/2007 | Strebel et al. | |
| 2010/0179725 A1 | 7/2010 | Boote et al. | |

(Continued)

FOREIGN PATENT DOCUMENTS

| | | |
|---|---|---|
| DE | 102010024776 A1 | 12/2011 |
| DE | 102014105208 A1 | 10/2015 |

(Continued)

*Primary Examiner* — Abby Lin
*Assistant Examiner* — Renee LaRose
(74) *Attorney, Agent, or Firm* — Dickinson Wright PLLC

(57) ABSTRACT

The proposed solution in particular relates to a method for generating a haptic feedback on a vehicle part including an operating element that is accessible for a user for manual actuation, and in response to an electronically detected actuation of the operating element, a feedback haptically perceptible for the user is generated in that the vehicle part and the operating element is adjusted back and forth in a power-operated way or is put into vibration.

13 Claims, 1 Drawing Sheet

(51) Int. Cl.
    *B60K 35/25*         (2024.01)
    *B60K 35/80*         (2024.01)
    *B60Q 9/00*          (2006.01)

(52) U.S. Cl.
    CPC .......... *B60Q 9/00* (2013.01); *B60K 2360/143*
        (2024.01); *B60K 2360/66* (2024.01); *E05Y*
        *2400/37* (2024.05); *E05Y 2400/80* (2013.01);
        *E05Y 2400/85* (2013.01); *E05Y 2900/55*
        (2013.01)

(58) Field of Classification Search
    CPC .............. E05F 15/6903; E05F 15/6905; E05F
        15/6907; E05F 15/6909; E05F 15/6911;
        E05F 15/6914; E05F 15/6916; E05F
        15/6918; E05F 15/695; B60J 5/0493;
        B60Q 9/00; B60K 2360/143; B60K
        2360/66; E05Y 2400/80
    See application file for complete search history.

(56) References Cited

U.S. PATENT DOCUMENTS

| | | | |
|---|---|---|---|
| 2010/0250071 A1* | 9/2010 | Pala ....................... | B60K 35/22 |
| | | | 341/20 |
| 2016/0176372 A1* | 6/2016 | Kim ..................... | G06F 3/0482 |
| | | | 701/49 |
| 2017/0362878 A1* | 12/2017 | Gage ....................... | E05F 15/75 |
| 2018/0284932 A1 | 10/2018 | Nehmad | |
| 2018/0292904 A1* | 10/2018 | Müller ................... | G06F 3/041 |
| 2018/0345910 A1* | 12/2018 | Papanikolaou ........... | B08B 7/02 |
| 2020/0050278 A1 | 2/2020 | Ding et al. | |
| 2021/0381202 A1* | 12/2021 | Jones .................... | B60K 35/20 |

FOREIGN PATENT DOCUMENTS

| | | |
|---|---|---|
| DE | 102014018458 B3 | 12/2015 |
| DE | 102014018455 A1 | 6/2016 |
| EP | 1091074 B1 | 7/2005 |
| WO | 2015155268 A1 | 10/2015 |

* cited by examiner

METHOD FOR GENERATING A HAPTIC FEEDBACK ON A VEHICLE PART

CROSS-REFERENCE TO RELATED APPLICATIONS

This application is the U.S. National Phase of PCT Application No. PCT/EP2021/071827 filed Aug. 5, 2021, which claims priority to German Patent Application No. 10 2020 210 109.4 filed on Aug. 10, 2020, the disclosures of which are hereby incorporated in their entirety by reference herein.

TECHNICAL FIELD

The present disclosure relates to generating a haptic feedback on a vehicle part.

BACKGROUND

The generation of a haptic feedback or a haptically perceptible return message after a manual actuation of an operating element regularly is desired to inform a user that an actuation of an operating element not realized via a movable switch has been detected successfully. It is known for example to integrate a touch display as an operating element on a vehicle part in the form of a pane or to project a display onto the pane as an operating element. Then, it is not easily possible to haptically inform a user about a successfully detected actuation of the respective operating element, as no physically present operating element is adjusted. The same in principle also applies for other vehicle parts, such as for vehicle parts on which comparable operating elements are provided.

From DE 10 2014 105 208 A1 there is known for example a touchpad as an operating element, which is integrated into a lateral pane of a vehicle door and which is coupled to a piezoelectric actuator on the pane in order to generate a haptic feedback on actuation of the touchpad. The actuator here is provided in a seal for the pane on a frame of the vehicle door so that in a region close to the seal the window pane can be put into vibration. The accommodation of a piezoelectric actuator in a seal, however, is quite complex in terms of manufacture. In addition, the sealing effect of the seal possibly is permanently reduced by frequent actuation of the piezoelectric actuator.

SUMMARY

Against this background, it may be the objective of the underlying proposed solution to provide an improved method for generating a haptic feedback on a vehicle part including at least one operating element.

A proposed method provides to generate a haptically perceptible feedback (or a haptically perceptible return message) in response to an electronically detected actuation of an operating element on a vehicle part, in that the vehicle part including the operating element is adjusted back and forth in a power-operated way and/or is put into vibration.

The proposed solution may be to provide a user with a haptically perceptible return message on a vehicle part, when an actuation of an operating element successfully has been detected electronically, namely in that the vehicle part including the operating element is adjusted at least once in two opposite adjustment directions and/or is put into vibration in quick succession.

A power-operated back-and-forth adjustment of the vehicle part in response to an individual electronic actuation of the operating element for generating a haptically perceptible feedback, for example, is to be distinguished from a possible adjustment of the vehicle part in response to an adjustment signal triggered by a user, in case the vehicle part additionally can also be adjusted in a power-operated way independently of the haptic feedback. In contrast to a conventional adjustment of the vehicle part in two different adjustment directions by twice actuating a control element (once for the adjustment in the one adjustment direction and once for the adjustment in the other adjustment direction), in the present case then for example the vehicle part is adjusted back and forth via an individual electronically detected actuation of the operating element and also merely for a comparatively short period of only few milliseconds, in order to provide a haptic feedback. This, for example, includes the fact that a power-operated back-and-forth adjustment of the vehicle part along an adjustment axis in two mutually opposite adjustment directions for a haptic feedback merely bridges an adjustment path that is less than $\frac{1}{200}$ of a total adjustment path length which the vehicle part can maximally cover between two end positions. Consequently, merely a micro-stroke movement is realized for the haptic feedback. For example, a pane in a vehicle door typically can be adjusted by about 0.45 m from a completely lowered end position up to a completely raised end position. A back-and-forth adjustment for a haptic feedback then for example merely bridges an adjustment path of 0.2 mm. By utilizing a drive provided anyway for a power-operated adjustment of the respective vehicle part, additional components for generating the haptic feedback can be saved. For example, it merely is necessary to provide an electronic control unit completed in this respect for driving the vehicle part. For example, the electronic control unit correspondingly can merely be provided with an additional digital input or receive an additional bus information via a vehicle bus system for generating the haptic feedback.

For a power-operated back-and-forth adjustment of the vehicle part in one design variant, an electromotive drive provided for the adjustment of the vehicle part is actuated for less than 10 ms, for example, less than 5 ms or less than 1.5 ms for rotation in a first direction of rotation and (directly subsequently) for less than 10 ms, for example, less than 5 ms or less than 1.5 ms for rotation in an opposite second direction of rotation. For example, an actuation for 1 ms can be provided for a rotation in the respective first or second direction of rotation. For a window lifter drive for the adjustment of a (window) pane this can mean for example that a drive motor of the window lifter drive is actuated for 1 ms at full power in the direction of opening and subsequently for 1 ms at full power in the direction of closing (or vice versa) in order to provide a haptic feedback on the pane.

The duration of an actuation of the electromotive drive can be constant in principle. In one design variant, the duration of the actuation of the drive however is dependent on an adjustment position of the vehicle part. Depending on the—possibly separately detected—adjustment position of the vehicle part, for example the duration of the actuation for a rotation in the one or other direction of rotation thus can vary. This for example includes the fact that in dependence on an adjustment position of the vehicle part, the duration of the actuation of the drive for a rotation in the one direction of rotation is (specified) greater or less than the duration of the actuation of the drive for a rotation in the other direction of rotation. Such a variation of the duration of the actuation, for example, can take account of the drive or gear backlash in a drive mechanism, which differs depending on the adjustment position, for the adjustment of the vehicle part. For example, in a window lifter drive at least one Bowden cable can be provided for the adjustment of a pane as a vehicle part. In one example, however, when then pane is in a completely lowered or completely raised end position, it is advantageous to provide a cable backlash in the Bowden cable by an actuation in the respective opposite direction in dependence on the currently taken end position.

Against this background, for example, an adjustment in a first adjustment direction, along which the vehicle part has previously been adjusted in connection with a conventional adjustment, can also be effected for the haptic feedback with a shorter duration than in an opposite second adjustment direction, as a Bowden cable of the window lifter drive still is tensioned in the first adjustment direction. An actuation in the opposite second adjustment direction is chosen greater in order to compensate a cable backlash. Alternatively or additionally, a longer actuation for generating a defined adjusting force in the direction of a pane stop and hence in the direction of closing can be combined with a subsequent micro-stroke in an adjustment direction opening the pane to provide the haptic feedback. Alternatively or additionally, different signal courses, for example, at least one signal course with a faster (ramp-shaped) rise can be provided for bridging a backlash within the drive mechanism.

In one design variant, the back-and-forth adjustment of the vehicle part for generating a haptic feedback is supported by at least one element, e.g. a seal, elastically acting on the vehicle part. This, for example, includes the fact that an adjustment in a first adjustment direction of the vehicle part is effected by utilizing an electromotive drive, and resetting into an opposite second adjustment direction is effected by action of the previously elastically compressed element. Thus, for example an active actuation of the drive initially can be provided in only one of the two adjustment directions in order to move the vehicle part on block. A return path for the back-and-forth adjustment of the vehicle part then is controlled by relaxing the elastic element that was compressed while moving the vehicle part on block.

To learn a signal course for the actuation of an electromotive drive provided for the adjustment of the vehicle part for the factual feedback, an adjustment of the haptics can also be provided for example via manufacturing tolerances. For this purpose, for example, a reverse backlash is determined by at least one initial run and hence during a learning phase. Here, for example motor revolutions and/or Hall signals of a Hall sensor are detected in relation to a current consumption of the electromotive drive. There can also be included parameters for a possible sluggishness or occurring wear. Moreover, in one design variant there can also be included signals of at least one acceleration sensor.

For example, for the adjustment of the vehicle part an electromotive drive is provided, which can be controlled via a pulse-width-modulated signal. For a power-operated back-and-forth adjustment of the vehicle part, the electromotive drive for example can then be actuated over less than 30 periods, e.g. 25 periods, for rotations (immediately succeeding each other) in two mutually opposite directions of rotation. For example, this can be used to realize an adjustment via half pulses, such as sinusoidal half-pulses. In the end, the only decisive factor in the actuation is the comparatively short duration of actuation, which permits the generation of a pronounced haptic feedback on the vehicle part, for example on a pane of a vehicle to be adjusted by an electric motor.

In one design variant, for a first haptic feedback due to the power-operated back-and-forth adjustment of the vehicle part an electromotive drive provided for the adjustment of the vehicle part is actuated via a particular first signal course to perform rotations in two mutually opposite directions of rotation. This first signal course then differs from at least one second signal course, via which the electromotive drive is actuated when a second haptic feedback is to be provided via an adjustment of the vehicle part, which for a user touching the vehicle part—for example with a hand or at least one finger—perceptibly differs from the first haptic feedback. In such a design variant it consequently is provided to be able to generate different types of haptic feedback via different signal courses based on the situation and/or in dependence on an actuation of different operating elements on the vehicle part. Due to the different signal courses, the different types of feedback can differ for example in terms of duration, amplitude and/or frequency.

For generating a vibration of the vehicle part, one design variant provides a speaker that is provided for outputting sound audible for human ears, but additionally is operated with a frequency of less than 20 Hz. Thus, the speaker is provided for an audio output for the vehicle interior of the vehicle. For generating the haptic feedback, this speaker is operated with a frequency in a non-audible (for humans) range of less than 20 Hz in order to put the vehicle part into vibration. In this way, for example a speaker provided anyway in a vehicle door can be utilized to selectively put a vehicle part of the vehicle door, such as for example a pane or a door outer skin, into vibration for generating a haptic feedback when an operating element has been actuated on the vehicle door. For example, a bass speaker can be advantageous in this connection, as the same provides a comparatively large stroke of a speaker membrane.

In addition, the haptic feedback can also be supported with a sound output in order to for example use a first output sound or a first sound sequence to signal that the operating element has been actuated correctly. A second sound (or a second sound sequence) different therefrom on the other hand can be output for example when the operating element has been actuated incorrectly or a function to be triggered therewith currently is not available at all.

In a possible development, the speaker provided for generating the vibration of the vehicle part can also be mechanically coupled to the vehicle part to be put into vibration. In a vehicle door, this for example includes a mechanical coupling of the speaker to a door outer skin.

In principle, the mechanical coupling can also be switchable. This in particular includes the fact that the mechanical coupling is active only for a defined time period or can be deactivated again. For example, a mechanical coupling exists during a first vehicle condition, but not in another, second vehicle condition. For example, a speaker in a vehicle door is mechanically coupled to the door outer skin when the vehicle is standing and the vehicle engine is switched off, but not when the vehicle is moving.

As already explained above, the operating element can be provided on a vehicle door, such as on a vehicle part in the form of a pane of the vehicle door or on a vehicle part in the form of a door outer skin of the vehicle door. The operating element, for example, can be an integrated touchpad or a projected display or a projected virtual button, respectively. Correspondingly, a haptic feedback according to the proposed solution can be provided for example on input by a user via a button projected into a pane of the vehicle, on actuation of a door handle of the vehicle and/or on actuation of a virtual button on a vehicle door (such as a liftgate). Of course, however, the proposed solution can also be used on other vehicle parts, for example on a vehicle seat. This for example includes the fact that via a design variant of the proposed solution a haptic feedback is generated on actuation of a seat adjustment switch on a vehicle seat.

In a design variant for generating a vibration of a vehicle part in the form of a pane, the utilization of at least one piezo element for example is provided alternatively or in addition to the design variants explained above. The at least one piezo element then is provided on a carrier of a window lifter provided for the adjustment of the pane and connected to the window pane, in order to put the pane into vibration—in response to the electronically detected actuation of the operating element. For example, the at least one piezo element therefor is arranged between a portion of the carrier and a portion of the pane. Via the carrier, which also is referred to as a pane sensor, an adjusting force is transmitted for the adjustment of the pane. The carrier is a component of a window lifter drive to be separately connected to the pane, whereby the arrangement of at least one piezo element on the same is to be realized comparatively easily.

In a design variant for generating a vibration of the vehicle part, the use of a vibration element, e.g. of a motor with an imbalance mass, can be provided.

The proposed solution furthermore relates to a system for generating a haptic feedback. A proposed system comprises a vehicle part, an operating element on the vehicle part to be actuated manually by a user, and an electronic control unit that is configured to generate a feedback haptically perceptible for the user in response to the actuation of the operating element, in that the vehicle part including the operating element is adjusted back and forth in a power-operated way (by utilizing the electronic control unit) and/or is put into vibration.

A design variant of a proposed system consequently can be configured and adapted to realize a design variant of a proposed method. The advantages and features of design variants of a proposed method as explained above and below thus also apply for design variants of a proposed system, and vice versa.

In one example, a design variant of the proposed system can be a system for generating a haptic feedback on a vehicle door, such as on a pane or a door outer skin. For example, such a system comprises a window lifter drive with an electronic control unit for generating the haptic feedback via an electric motor of the window lifter drive. Alternatively or additionally, the system can comprise a speaker on the vehicle door to be actuated as explained above and/or at least one piezo element on a carrier of the window lifter drive.

Furthermore, the proposed solution provides a computer program product for an electronic control unit, via which a feedback haptically perceptible for a user can be generated on the vehicle part in response to the manual actuation of an operating element on a vehicle part, in that the computer program product comprises instructions which cause at least one processor of the electronic control unit to execute a proposed method on execution of the instructions and correspondingly actuate for example an electromotive drive, at least one speaker and/or at least one window lifter-side piezo element, as explained above.

The attached Figures by way of example illustrate possible design variants of the proposed solution.

DETAILED DESCRIPTION

Figure 1:
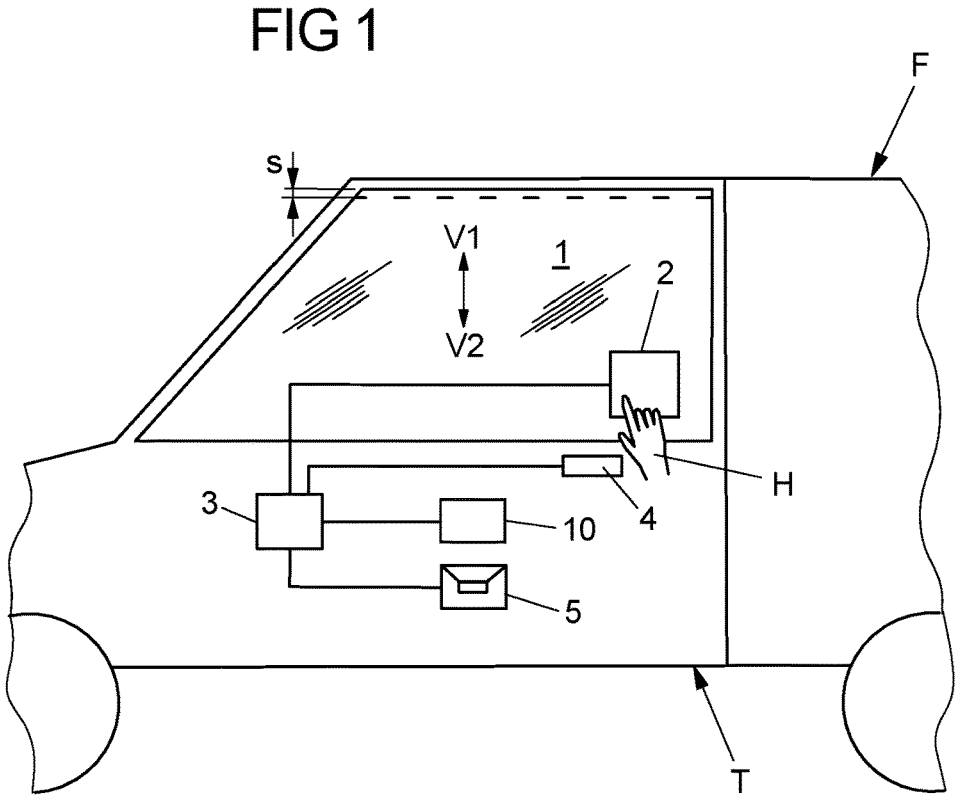
FIG. 1 illustrates a side view shows a vehicle with a vehicle door, which comprises a design variant of a proposed system.

FIG. 1 sectionally shows a vehicle F with a design variant of the proposed solution. The vehicle F comprises a lateral vehicle door T with an adjustable pane 1. Into this pane 1 an operating element 2 is integrated as part of a touchpad or forms part of a display projection. For example, the operating element 2 can be used to control different door or vehicle functions from outside the vehicle F.

To provide the user with a haptic feedback on the operating element 2 upon actuation of the operating element 2 via a hand H of a user, an electronic control unit 3 is provided. In the case of an electronically detected actuation of the operating element 2 by the hand H, this electronic control unit 3 can adjust the pane 1 and hence the operating element 2 back and forth (once or several times) and/or put it into vibration in a haptically perceptible way. A back-and-forth adjustment of the pane 1 along mutually opposite adjustment directions V1 and V2 here is effected by utilizing a window lifter drive 10 present anyway. In one design variant, this window lifter drive 10 comprises a drive motor, for example a brushless 3-phase d.c. motor (BLDC motor) which, upon successful electronic detection of an actuation of the operating element 2, is actuated to perform micro-stroke movements for a haptic feedback. For example, the adjustment path of these micro-stroke movements can be set in the form of a sinusoidal half-pulse. Via the electronic control unit 3, the pane 1 for example can be adjusted for less than 1.5 ms (e.g. 1.25 ms at a frequency of 200 Hz) and hence by merely about 0.2 mm, in order to provide a user with a haptically perceptible feedback on the hand H touching the pane 1.

Thus, the window lifter drive 10 present anyway is utilized for the haptic feedback, which for providing the haptic feedback is actuated with signal courses that are not utilized in conventional operation, i.e. for adjusting the pane 1 in order to clear or close the window opening. For a haptic feedback, the pane 1 merely covers an adjustment path s or a corresponding micro-stroke of about 0.2 mm. As compared to a maximum possible total adjustment path length from a completely closed end position to a maximally lowered end position of about 0.45 m, this is merely an extremely small fraction of the total adjustment path length.

For generating a haptic feedback, a speaker 5 of the vehicle door T can be used alternatively or in addition. This speaker 5 is provided for audio output in the vehicle interior. Via the electronic control unit 3, the speaker 5 furthermore can be actuated for emitting sound in the range of below 20 Hz not audible for humans, in order to thereby put the pane 1 into vibration for generating a haptic feedback. The speaker 5, which otherwise is provided for the audio output in the vehicle interior of the vehicle F and hence for emitting sound in the audible range, consequently is utilized here for generating a haptic feedback on the pane 1 for emitting sound in the non-audible low-frequency range.

Alternatively or additionally, not only the pane 1, but for example also a door outer skin of the vehicle door T can selectively be put into vibration via the speaker 5. A corresponding haptic feedback on the door outer skin then can be provided for example in the case of an electronically detected actuation of a door handle 4 of the vehicle door T.

Figure 2:
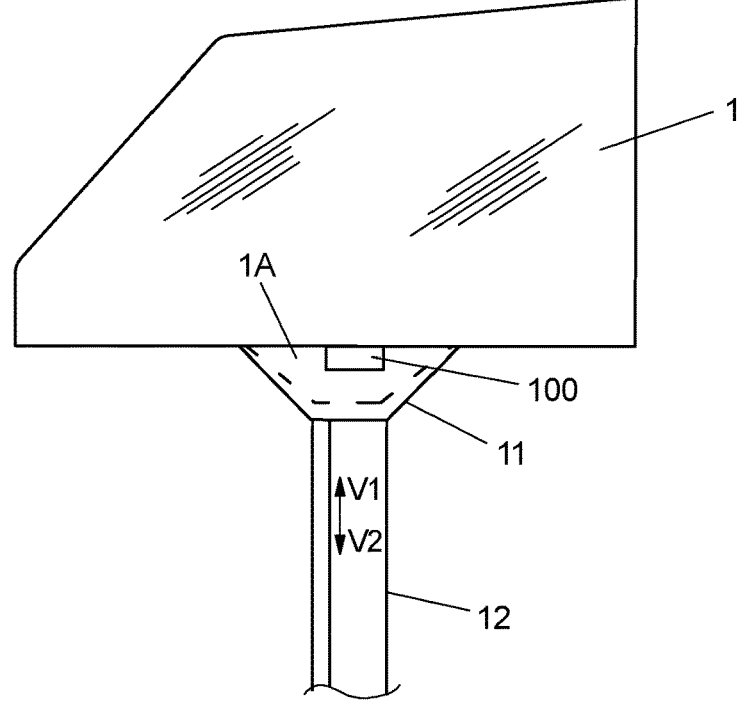
FIG. 2 illustrates a window pane of the vehicle door of FIG. 1 with components of a window lifter drive for the adjustment of the window pane, wherein at least one piezo element is provided on a carrier of the window lifter drive in order to put the pane into vibration for generating a haptic feedback.

In a development corresponding to FIG. 2, alternatively or additionally, a piezo element 100 is provided for the vibration of the pane 1 in response to a detected actuation of the operating element 2. This piezo element 100 is arranged on a carrier 11 of the window lifter drive 10 provided for the adjustment of the pane 1. The piezo element 100 here is arranged on the carrier 11 shiftably guided along a guide rail 12 of the window lifter drive in such a way that the piezo element 100 is present between a portion of the carrier 11 and a connecting portion 1A of the pane 1 connected to the carrier 11. In this way, the piezo element 11 can not only be accommodated on the carrier 11 in a comparatively simple way. Rather, a direct abutment against the connecting portion 1A also is possible in order to introduce structure-borne sound into the pane 1 for generating a vibration.

LIST OF REFERENCE NUMERALS 1 pane
1A connecting portion
10 window lifter drive
100 piezo element
11 carrier
12 guide rail
2 touchpad/display projection (operating element)
3 electronic control unit
4 door handle
5 speaker
F vehicle
H hand
s adjustment path/micro-stroke
T vehicle door
V1, V2 adjustment direction

The invention claimed is:

1. An apparatus, comprising:
an electromotive drive configured to adjust a vehicle window;
an electronic control unit;
an operating element on the vehicle window accessible for a user for manual actuation; and provided to electronically control a door function on the vehicle other than adjustment of the vehicle window from outside the vehicle; and
wherein, in response to an electronically detected manual actuation of the operating element a feedback haptically perceptible for the user is generated in that the vehicle window including the operating element is adjusted back and forth by the electromotive drive, wherein the electronic control unit is configured, for the back and forth adjustment of the vehicle window and in order to generate the haptically perceptible feedback on the vehicle window, to actuate the electromotive drive to rotate for less than 10 ms in a first direction of rotation and to rotate for less than 10 ms in an opposite second direction of rotation.

2. The apparatus of claim 1, wherein the apparatus includes a power-operated back-and-forth adjustment of the vehicle window that is effected in response to an individual electronic actuation of the operating element.

3. The apparatus of claim 1, wherein the apparatus includes a power-operated back-and-forth adjustment of the vehicle window that is effected along an adjustment axis in mutually opposite adjustment directions along which the vehicle window can be adjusted in a power-operated way independently of an actuation of the operating element.

4. The apparatus of claim 1, wherein a duration of the actuation of the drive is dependent on an adjustment position of the vehicle window.

5. The apparatus of claim 4, wherein in response to an adjustment position of the vehicle window, the duration of the actuation of the drive for a rotation in the one direction of rotation is greater or less than the duration of the actuation of the drive for a rotation in the other direction of rotation.

6. The apparatus of claim 1, wherein and the electromotive drive is controlled via a pulse-width-modulated signal; and wherein, in response to the power-operated back-and-forth adjustment of the vehicle window, the electromotive drive is actuated for less than 30 periods via two half-pulses for rotations in two mutually opposite directions of rotation.

7. The apparatus of claim 1, wherein the electromotive drive is configured to provide a first haptic feedback via a first signal course for the back and forth adjustment of the vehicle window and to provide a second haptic feedback via, at least one second signal course differing from the first signal course.

8. An apparatus, comprising:
a speaker for outputting sound not audible for a human ear;
an electronic control unit; and
an operating element on a vehicle door accessible for a user for manual actuation and provided to electronically control a function on the vehicle other than an adjustment of the vehicle window from outside the vehicle,
wherein the electronic unit is configured, in response to an electronically detected manual actuation of the operating element, to generate a feedback haptically perceptible for the user on the vehicle door by putting the vehicle door into vibration via operating the speaker with a frequency not audible for the human ear of less than 20 Hz.

9. The apparatus of claim 8, wherein the apparatus includes the speaker and the speaker is mechanically coupled to the vehicle door in order to put the vehicle door into vibration.

10. The apparatus of claim 1, wherein the operating element is provided a window pane or on a door outer skin of the operating element is configured to electronically detect an actuation of a door handle of the vehicle door.

11. An apparatus, comprising:
an electronic control unit;
a vehicle door including a door outer skin, and a window pane; and
an operating element on the window pane or the door outer skin, the operating element being accessible for a user for manual actuation and provided to electronically control a function other than an adjustment of the window pane from outside the vehicle,
wherein the electronic unit is configured, in response to an electronically detected manual actuation of the operating element, to generate a feedback haptically perceptible for the user on the window pane by putting the window pane into vibration or adjusting the window back and forth, the haptically perceptible feedback by adjusting the window back and forth being different to an adjustment of the window pane for clearing or closing a window opening in the vehicle door.

12. The apparatus of claim 11, wherein the vehicle door further includes a window lifter with a carrier for adjusting the window pane, and wherein the electronic unit is configured to generate the feedback haptically perceptible for the user on the window by actuating at least one piezo element on the carrier to put the window pane into vibration.

13. The apparatus of claim 12, wherein at least one piezo element is arranged between a portion of the carrier and a portion of the window pane.

\* \* \* \* \*